(12) United States Patent
Nakama (10) Patent No.: US 11,760,243 B2
(45) Date of Patent: Sep. 19, 2023

(54) ARMREST

(71) Applicant: TOYOTA BOSHOKU KABUSHIKI KAISHA, Aichi-ken (JP)

(72) Inventor: Kazuki Nakama, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/696,599

(22) Filed: Mar. 16, 2022

(65) Prior Publication Data

US 2022/0297582 A1   Sep. 22, 2022

(30) Foreign Application Priority Data

Mar. 22, 2021   (JP) ................. 2021-047029

(51) Int. Cl.
  *B60N 2/75*   (2018.01)
  *B60N 2/20*   (2006.01)
(52) U.S. Cl.
  CPC ............ *B60N 2/757* (2018.02); *B60N 2/206* (2013.01)
(58) Field of Classification Search
  CPC .......... B60N 2/757; B60N 2/206; B60N 2/36; B60N 2/546; B60N 2205/35
  USPC .................................................. 297/411.32
  See application file for complete search history.

(56) References Cited

U.S. PATENT DOCUMENTS

| 4,880,264 A * | 11/1989 | Yamazaki | B60N 2/366 297/378.13 |
| 2012/0139279 A1* | 6/2012 | Uwague-Igharo | B60N 2/79 296/37.8 |
| 2015/0097406 A1* | 4/2015 | Tanaka | B60N 2/757 297/378.1 |
| 2017/0203678 A1* | 7/2017 | Gomez | B60N 2/757 |
| 2017/0225596 A1 | 8/2017 | Tashiro et al. | |

FOREIGN PATENT DOCUMENTS

JP   2017-136983   8/2017

* cited by examiner

*Primary Examiner* — Mark R Wendell
(74) *Attorney, Agent, or Firm* — GREENBLUM & BERNSTEIN, P.L.C.

(57) ABSTRACT

An armrest serves as an elbow rest of a seat device in a case where the armrest is tilted forward and serves as a backrest of the seat device in a case where the armrest is raised rearward. The armrest includes an armrest pad configured to elastically support a load applied to a backrest surface forming a part of a front surface of the seat device in a case where the armrest serves as the backrest, an armrest cover configured to cover the armrest pad, a protrusion that protrudes from the backrest surface of the armrest cover and abuts against an upper surface of a seat cushion of the seat device in a case where the armrest is tilted forward, and a cutout portion formed in a region that overlaps the protrusion of the armrest cover in a thickness direction of the armrest.

8 Claims, 6 Drawing Sheets

ABSTRACT

ARMREST

CROSS-REFERENCE TO RELATED APPLICATIONS

This application is based on and claims priority under 35 USC 119 from Japanese Patent Application No. 2021-047029 filed on Mar. 22, 2021, the contents of which are incorporated herein by reference.

TECHNICAL FIELD

The present disclosure relates to an armrest. More specifically, the present disclosure relates to an armrest that serves as an elbow rest of a seat device when the armrest is tilted forward and serves as a backrest of the seat device when the armrest is raised rearward.

BACKGROUND

There is known a configuration in which an armrest capable of being unfolded and accommodated is provided in a central portion of a seat back of a rear seat of an automobile (JP-A-2017-136983). The armrest serves as an elbow rest when the armrest is tilted forward from the central portion of the seat back, and is switched to a backrest that is accommodated in the central portion of the seat back and forms a part of the seat back when the armrest is raised rearward. A band that serves as a gripper when the armrest is pulled out forward is attached to the armrest so as to protrude from a backrest surface of the armrest.

SUMMARY

In the related art described above, since the band that serves as a protrusion is abutted against an upper surface of a seat cushion when the armrest is tilted forward, an indentation may remain on the upper surface of the seat cushion. Therefore, the present disclosure provides an armrest in which an indentation is less likely to be formed even when a protrusion abuts on an upper surface of a seat cushion when the armrest is tilted forward.

In order to solve the above problem, the armrest of the present disclosure has the following illustrative aspects.

That is, the armrest of the present disclosure is an armrest configured to serve as an elbow rest of a seat device in a case where the armrest is tilted forward and serve as a backrest of the seat device in a case where the armrest is raised rearward. The armrest includes an armrest pad configured to elastically support a load applied to a backrest surface forming a part of a front surface of the seat device in a case where the armrest serves as the backrest and an armrest cover configured to cover the armrest pad.

In addition, the armrest includes a protrusion that protrudes from the backrest surface of the armrest cover and abuts against an upper surface of a seat cushion of the seat device in a case where the armrest is tilted forward. Furthermore, the armrest includes a cutout portion formed in a region that overlaps the protrusion of the armrest cover in a thickness direction of the armrest.

According to the above configuration, when the armrest is tilted forward and the protrusion is abutted against the upper surface of the seat cushion, a periphery of the cutout portion of the armrest pad is easily deformed due to the cutout portion formed in the armrest pad. Therefore, even when the protrusion is abutted against the upper surface of the seat cushion, an indentation is unlikely to be formed on the upper surface of the seat cushion.

In addition, the armrest of the present disclosure may be further configured as follows. The armrest is fitted into a recess of a forward-tiltable seat back of the seat device from a front side to serve as the backrest, and the armrest is tilted forward together with the seat back in a case where the seat back is tilted forward to abut the protrusion against the upper surface of the seat cushion.

According to the above configuration, even in a configuration in which the protrusion is relatively strongly abutted against the upper surface of the seat cushion upon receiving weight of the armrest and the seat back, an indentation is unlikely to be formed on the upper surface of the seat cushion.

In addition, the armrest of the present disclosure may be further configured as follows. The protrusion is a strip-shaped band that serves as a gripper in a case where the armrest is tilted forward, and a resin plate that serves as a core material is inserted into the band. The cutout portion is formed in a region that overlaps the resin plate in the thickness direction of the armrest.

According to the above configuration, even when the protrusion has a hard configuration in which the resin plate is incorporated, abutment against the upper surface of the seat cushion is alleviated by the cutout portion. Therefore, an indentation is unlikely to be formed on the upper surface of the seat cushion.

In addition, the armrest of the present disclosure may be further configured as follows. The band extends in a seat width direction, two ends of the band are fixed to the armrest cover, and the band overlaps the cutout portion in the thickness direction of the armrest over an entire region in an in-plane direction of the backrest surface.

According to the above configuration, since the band is configured to cover the entire region where the cutout portion is formed, highlight can be prevented from being formed on the backrest surface of the armrest due to recess of the cutout portion. In addition, since the band is less likely to be embedded in a region that is easily recessed due to the cutout portion, deterioration of ride comfort can be prevented.

In addition, the armrest of the present disclosure may be further configured as follows. The armrest pad includes: a pad body; and a laminated pad provided in a laminated manner on a side of the backrest surface relative to the pad body and softer than the pad body. The cutout portion is formed to penetrate the laminated pad in the thickness direction of the armrest.

According to the above configuration, the cutout portion can be appropriately formed by a simple configuration in which a through hole is punched out in the laminated pad that is laminated in order to soften surface hardness of the armrest pad on the backrest surface side.

DETAILED DESCRIPTION

Hereinafter, illustrative embodiments of the present disclosure will be described with reference to the drawings.

First Illustrative Embodiment (Schematic Configuration of Armrest 10)

First, a configuration of an armrest 10 according to a first illustrative embodiment of the present disclosure will be described with reference to FIGS. 1 to 6. In the following description, directions such as front, rear, up, down, left, and right indicate the respective directions shown in the drawings. In addition, when the term "seat" is attached to each direction such as a "seat width direction", the direction indicates a direction based on an orientation of a seat device 1 described later. In addition, in the following description, when a specific reference diagram is not shown, or when there is no reference numeral corresponding to the reference diagram, any one of FIGS. 1 to 6 is referred to as appropriate.

Figure 1:
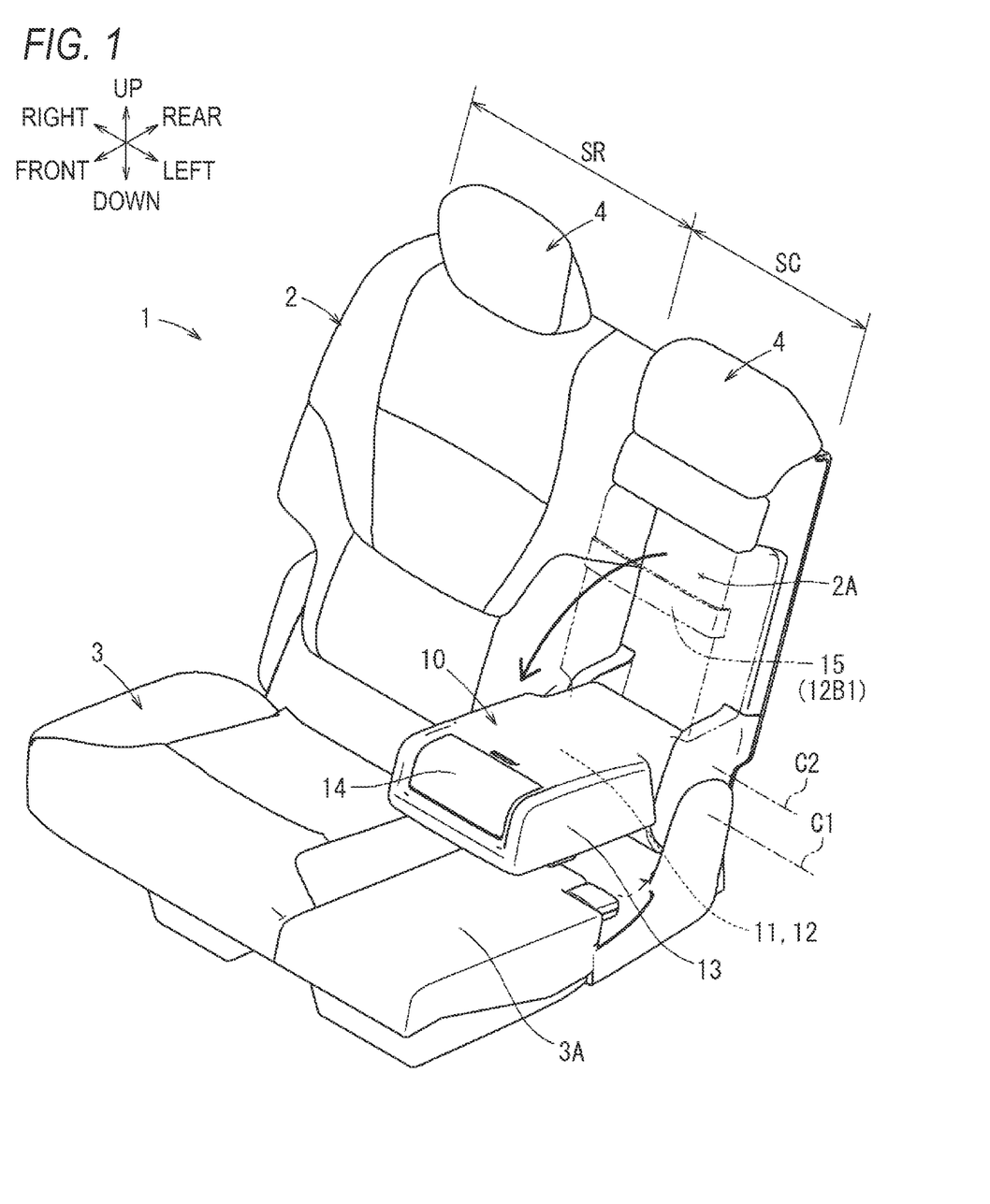
FIG. 1 is a perspective view showing a state where an armrest according to a first illustrative embodiment is tilted to a use position.

As shown in FIG. 1, the armrest 10 according to the present illustrative embodiment is configured as a center armrest provided in a central portion of the seat device 1 that constitutes a rear seat of an automobile. The rear seat is configured as a bench seat on which three persons can be seated in the same row. The seat device 1 includes a right seat portion SR and a center seat portion SC. A division ratio between the right seat portion SR, the center seat portion SC, and a left seat portion (not shown) in the seat width direction is 4:2:4.

The seat device 1 includes a seat back 2 that forms a backrest of a seated person, a seat cushion 3 that forms a seating portion, and a headrest 4 that forms a headrest. The seat back 2 is divided into the right seat portion SR and the center seat portion SC such that the right seat portion SR and the center seat portion SC can be individually tilted forward.

Specifically, the seat back 2 is configured in such a manner that left and right sides of lower ends of the right seat portion SR and the center seat portion SC are connected to corresponding rear ends of the seat cushion 3 via recliners (not shown), respectively. As a result, the seat back 2 can be folded in such a manner that the right seat portion SR and the center seat portion SC are individually tilted forward around a reclining hinge center C1 located on a lower end side and are overlapped with an upper surface 3A of the seat cushion 3 (see FIG. 3).

Figure 2:
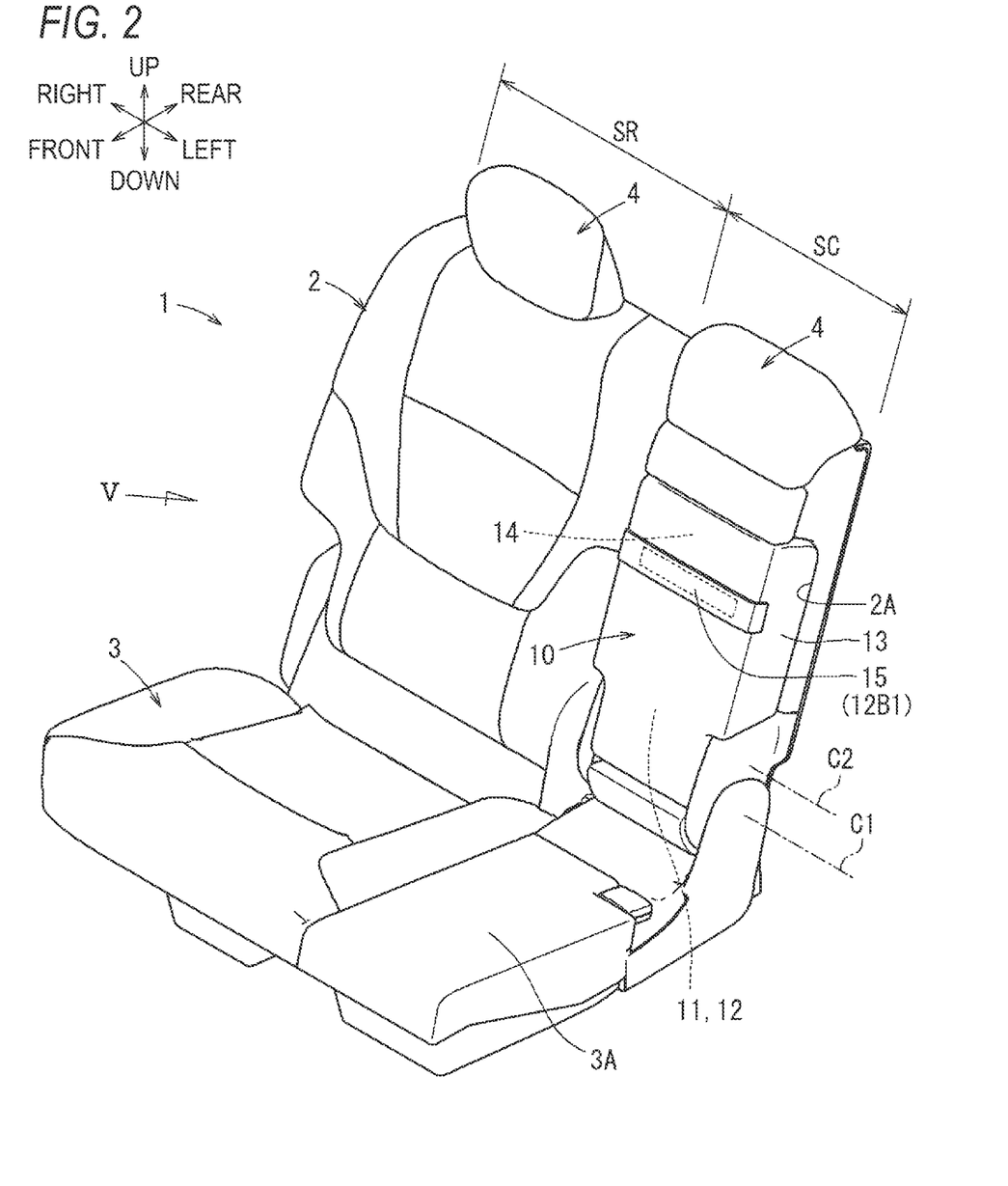
FIG. 2 is a perspective view showing a state where the armrest is raised to an accommodation position.

As shown in FIGS. 1 and 2, the seat cushion 3 is configured in such a manner that the right seat portion SR and the center seat portion SC are connected to each other in an integrated manner. The armrest 10 is provided to be capable of being unfolded and accommodated in a vertically-long accommodation recess 2A formed in the center seat portion SC of the seat back 2. Here, the accommodation recess 2A corresponds to a "recess" of the present disclosure.

Specifically, the armrest 10 is configured in such a manner that left and right sides of a base end thereof are connected to wall portions of left and right sides of the accommodation recess 2A of the seat back 2 via pins (not shown), respectively. As a result, the armrest 10 can be tilted forward from the seat back 2 around a rotation center C2 on the side of the base end so as to be unfolded as an elbow rest, or can be raised backward so as to be accommodated in the accommodation recess 2A.

As shown in FIG. 1, when the armrest 10 is tilted forward from the seat back 2, the armrest 10 is laid down to a substantially horizontal position above the seat cushion 3. As a result, the armrest 10 is unfolded as the elbow rest such that a seated person seated in the right seat portion SR or the left seat portion (not shown) of the seat device 1 can place an elbow on an upper surface of the armrest 10.

As shown in FIG. 2, when the armrest 10 is raised rearward from the unfolded state described above, the armrest 10 is fitted into the accommodation recess 2A of the seat back 2 so as to be flush with a backrest surface. As a result, the armrest 10 is accommodated as a backrest that allows a seated person seated in the center seat portion SC to lean on a front surface that is flush with the backrest surface.

The armrest 10 is tilted forward to a position where the armrest 10 serves as the elbow rest as described above with reference to FIG. 1 when a user grips a band 15 attached to a backrest surface side of the armrest 10 with a hand and pulls out the band 15 forward from the accommodated state described above. In addition, when the user operates to raise the armrest 10 rearward from the unfolded state, the armrest 10 is raised rearward to a position where the armrest 10 serves as the backrest as described above with reference to FIG. 2.

Figure 3:
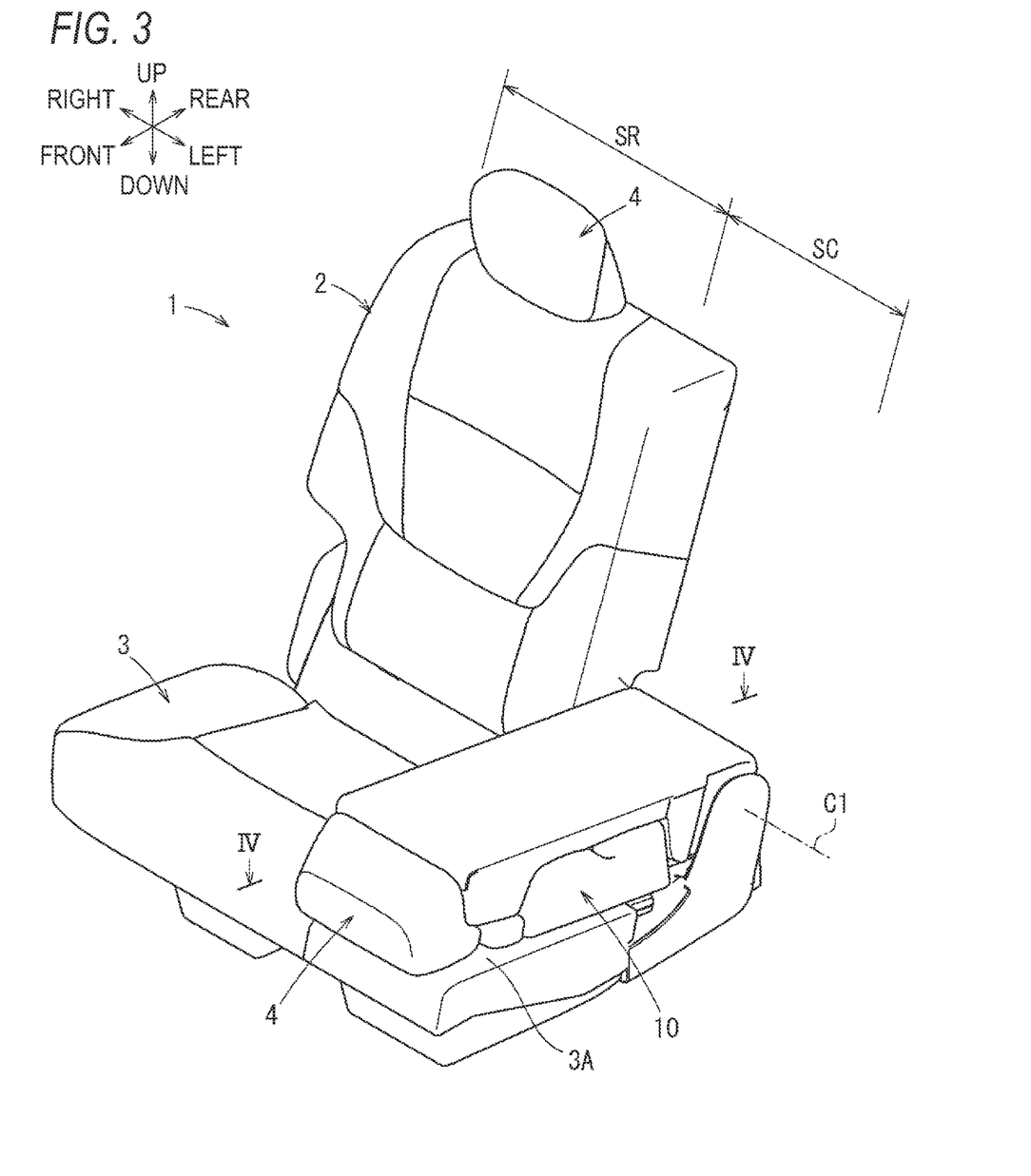
FIG. 3 is a perspective view showing a state where a seat back is tilted forward.
Figure 4:
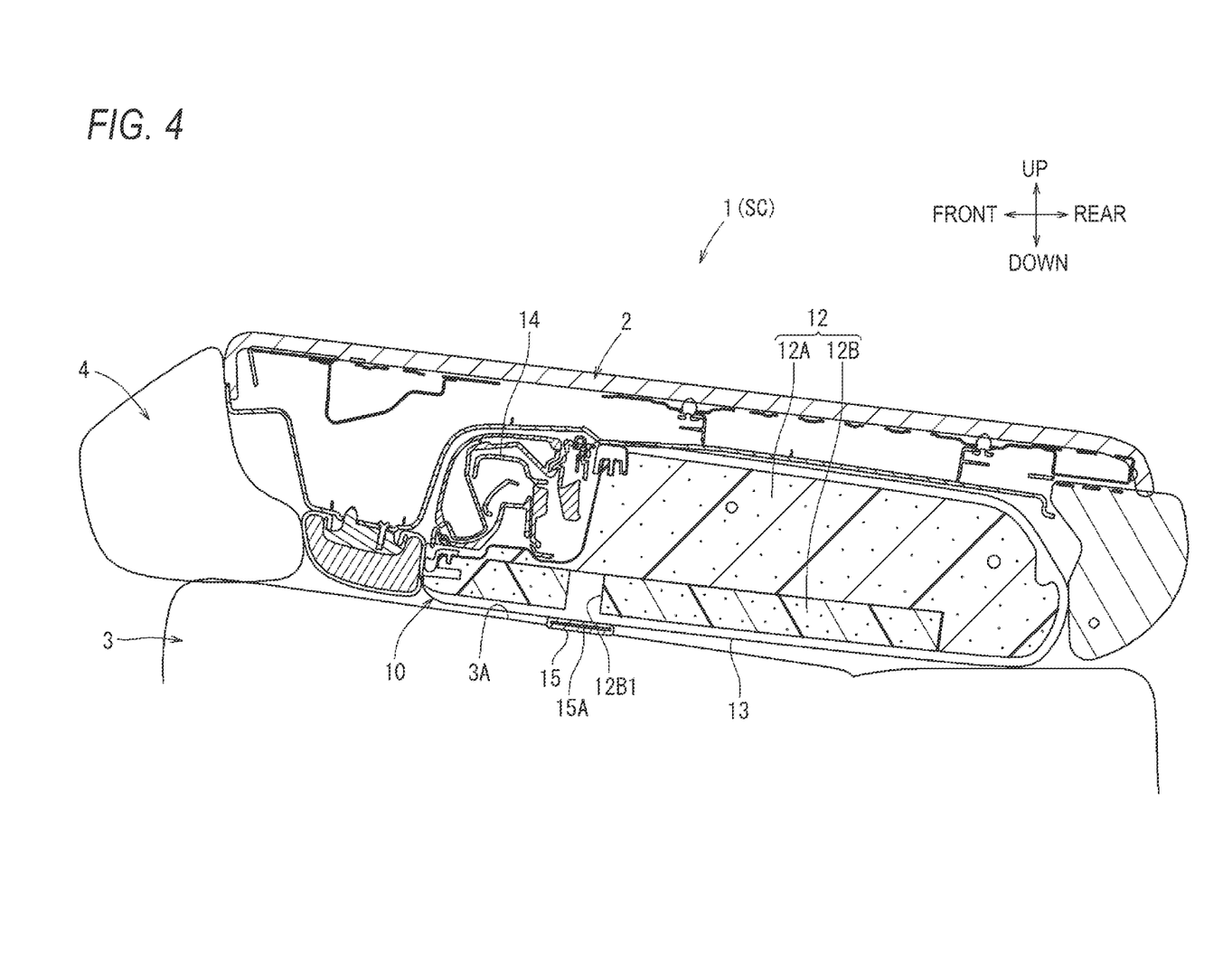
FIG. 4 is a cross-sectional view taken along line IV-IV of FIG. 3.

As shown in FIG. 3, when the center seat portion SC of the seat back 2 is tilted forward around the reclining hinge center C1, the armrest 10 is folded so as to overlap the upper surface 3A of the seat cushion 3 together with the seat back 2. As a result, as shown in FIG. 4, the band 15 that is attached to the backrest surface side of the armrest 10 and protrudes therefrom is pressed against the upper surface 3A of the seat cushion 3.

Due to the pressing described above, a pressing force provided by weight of the armrest 10 and the seat back 2 is applied from the band 15 to the upper surface 3A of the seat cushion 3. However, the armrest 10 is formed therein with a through hole 12B1 that can make it difficult for an indentation to be formed on the upper surface 3A of the seat cushion 3 even when the pressing force is applied from the band 15 to the upper surface 3A of the seat cushion 3 (see FIGS. 4 and 5). Here, the band 15 corresponds to a "protrusion" of the present disclosure. In addition, the through hole 12B1 corresponds to a "cutout portion" of the present disclosure.

(Configuration of Each Part of Armrest 10)

Figure 6:
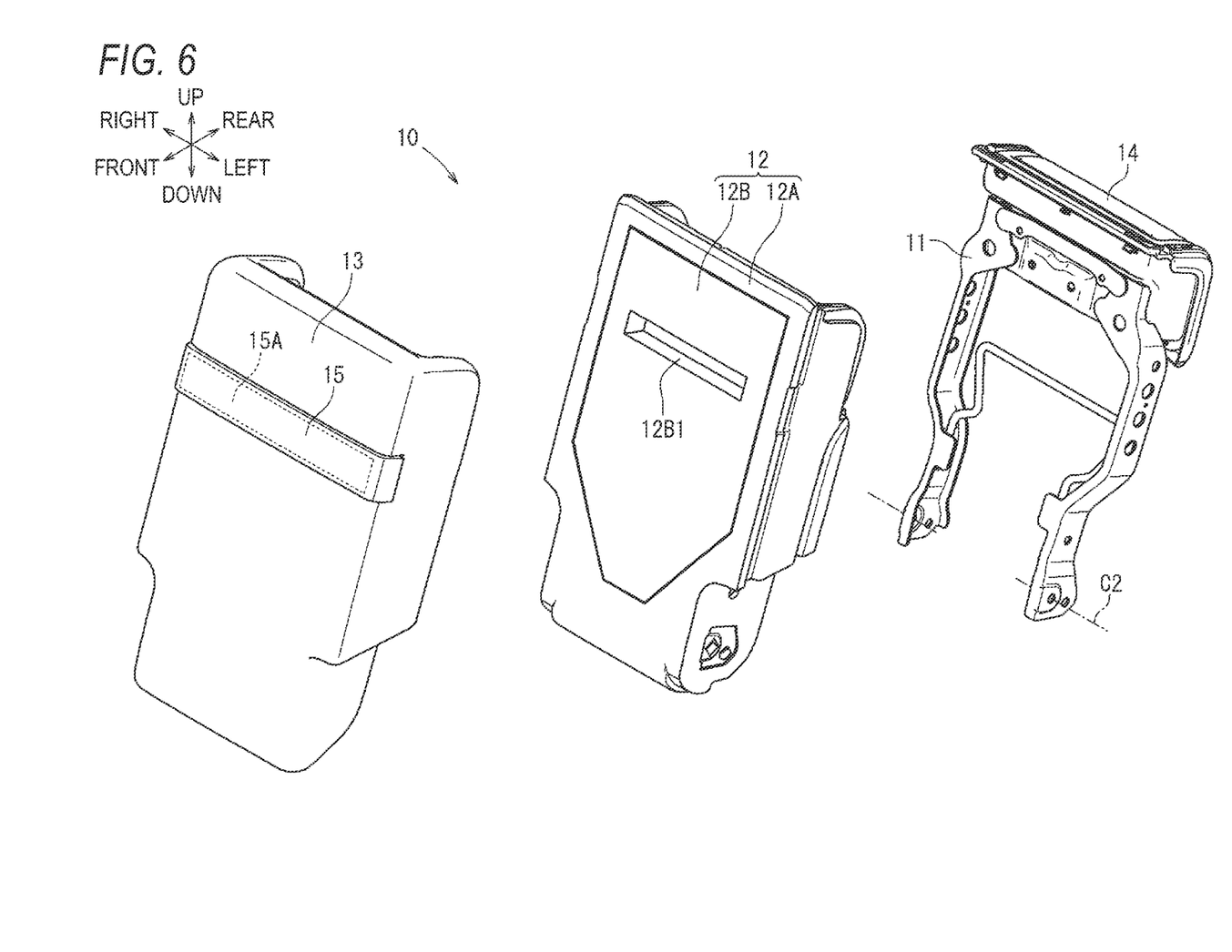
FIG. 6 is an exploded perspective view of the armrest.

Hereinafter, a specific configuration of each part of the armrest 10 will be described in detail. As shown in FIG. 6, the armrest 10 includes a metal armrest frame 11 that forms an internal framework of the armrest 10. In addition, the armrest 10 includes an armrest pad 12 that is made of urethane foam. The armrest pad 12 is set to cover the armrest frame 11 and elastically supports a load received from a seated person.

The armrest 10 also includes an armrest cover 13 that is made of fabric. The armrest cover 13 covers an entire surface of the armrest pad 12 and forms a design surface of the armrest 10. The armrest 10 also includes a resin cup holder 14 that is capable of holding a drink container at a tip end of the armrest 10. The armrest 10 also includes the band 15 that is made of fabric and attached to a region on a backrest surface side of the armrest cover 13.

The armrest frame 11 is formed into a substantially U-shape. The armrest frame 11 is configured in such a manner that the above-described pins (not shown) are inserted into two ends of the U-shape in the seat width direction and coupled thereto. The armrest frame 11 is configured to be supported via these pins (not shown) so as to be rotatable about the rotation center C2 in a seat front-rear direction.

The armrest pad 12 has a two-layer structure including a pad body 12A that is made of a urethane chip and formed into a basic shape of the armrest 10, and a flat plate-shaped laminated pad 12B that is made of a urethane slab softer than the urethane chip and provided in a laminated manner on a backrest surface side of the pad body 12A. The laminated pad 12B is fitted into a recess formed in a central portion of a surface of the pad body 12A on the backrest surface side, and is set so as to form a backrest surface flush with the pad body 12A.

As described above, the soft laminated pad 12B is provided in the laminated manner in the central portion of the surface of the pad body 12A on the backrest surface side, so that cushioning performance on the backrest surface side when the armrest 10 is used as the backrest is appropriately improved. That is, since the armrest pad 12 has the two-layer structure as described above, hardness of each layer can be individually adjusted, and thus cushion feeling when the armrest 10 is used as the backrest can be appropriately adjusted.

The laminated pad 12B of the armrest pad 12 is formed with a horizontally-long rectangular through hole 12B1 that penetrates the laminated pad 12B in a thickness direction thereof. The through hole 12B1 is formed in a hole shape elongated in the seat width direction along a region that overlaps the band 15 attached to the armrest cover 13 in the thickness direction.

Figure 5:
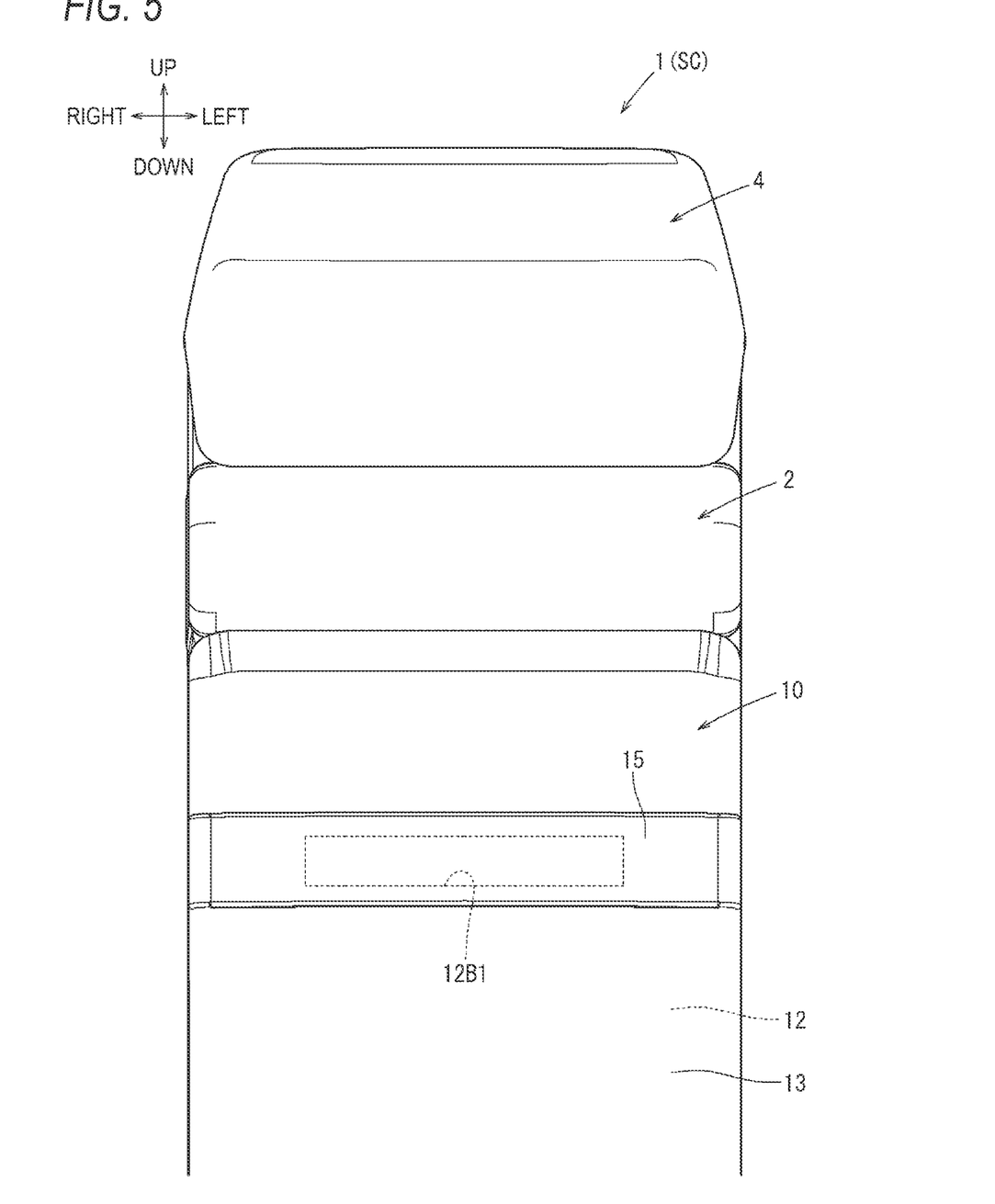
FIG. 5 is taken along a direction of an arrow V of FIG. 2.

Specifically, as shown in FIG. 5, the through hole 12B1 is formed only in the region that overlaps the band 15 in the thickness direction. More specifically, the through hole 12B1 is formed in a rectangular hole shape whose hole dimension in a seat height direction and the seat width direction is slightly smaller than that of the band 15, and is arranged to overlap an intermediate portion excluding a peripheral edge of the band 15 in the thickness direction.

As shown in FIG. 6, the through hole 12B1 is formed in an intermediate region of the laminated pad 12B such that two seat width direction ends of the laminated pad 12B are left. As shown in FIG. 4, the through hole 12B1 is formed at a position closer to a tip end side (front end side in FIG. 4) than a center in a length direction (front-rear direction in FIG. 4) of the armrest 10. However, the through hole 12B1 is disposed at a position displaced toward a base end side (rear side in FIG. 4) of the armrest 10 relative to the cup holder 14 so as to avoid overlapping in the thickness direction with the cup holder 14 that is incorporated in a tip end on an elbow rest surface side (upper surface side in FIG. 4) of the pad body 12A.

With the above arrangement, the through hole 12B1 is arranged to overlap with a thick portion of the pad body 12A while avoiding overlapping with a thin portion of the pad body 12A in which the cup holder 14 is incorporated. As a result, even if the armrest pad 12 is formed with the through hole 12B1 that makes it difficult for an indentation to be formed by the band 15, the cushioning feeling is unlikely to be impaired when the armrest 10 is used as the backrest.

The armrest cover 13 is formed in a bag shape that covers the armrest pad 12 covering the armrest frame 11 from the base end side toward the tip end side of the armrest 10. A tip end portion of the armrest cover 13, which covers the armrest pad 12, is hooked and fastened to a fastening portion (not shown) formed at a tip end portion, where the cup holder 14 is assembled, of the armrest frame 11.

As a result, the armrest cover 13 holds the armrest pad 12 in a state of being pressed against the armrest frame 11 by tension applied thereto. The armrest cover 13 is stretched over an entire surface of the armrest pad 12 so as to be in close contact with the armrest pad 12 without being lifted therefrom and without wrinkles.

The cup holder 14 includes an openable and closable lid, and is formed in a container shape that allows a drink container to be set at two positions on left and right sides. After the armrest pad 12 and the armrest cover 13 are assembled to the armrest frame 11, the cup holder 14 is snap-fitted to a tip end of the armrest frame 11 and thus assembled to the armrest frame 11 to cover and hide a terminal portion of the armrest cover 13 from the outside.

The band 15 is sewn into a band shape whose cross section is cylindrical, and a flat plate-shaped resin plate 15A that serves as a core material is inserted into the band 15. The band 15 is provided to cross a region on the backrest surface side of the armrest cover 13 in the seat width direction. Two end portions of the band 15 are hooked and sewn to side pieces on left and right sides of the armrest cover 13.

The band 15 is configured in such a manner that the core material therein is provided only in a portion extending in the seat width direction in the region on the backrest surface side, and is not provided in portions hooked to the side pieces on the left and right sides of the armrest cover 13. In a free state of the band 15, the band 15 is provided in a state where a portion extending in the seat width direction in the region on the backrest surface side is in close contact with the backrest surface of the armrest cover 13 so as to overlap the backrest surface.

However, due to a thickness thereof, the band 15 is provided in a state of protruding from the armrest cover 13. Moreover, the band 15 is harder than the armrest cover 13 due to rigidity of the core material inserted therein.

When a force is applied to the band 15, such as when the user grips and pulls the band 15 out forward, the core material therein is bent, the force is transmitted to the armrest 10, and thus a force is applied to the armrest 10 in a forward tilt direction. The band 15 is formed at a position closer to the tip end side (upper end side in the drawing) than the center in the length direction (up-down direction in the drawing) of the armrest 10, that is, at a position far away from the rotation center C2 of the armrest 10. As a result, the band 15 is applied with a pulling force applied by the user as a moment of a large force for pulling the armrest 10 out forward.

The through hole 12B1 formed in the laminated pad 12B of the armrest pad 12 is formed in a region that overlaps the resin plate 15A inserted into the band 15 in the thickness direction. Therefore, as shown in FIG. 4, when the band 15 is pressed against the upper surface 3A of the seat cushion 3 due to forward tilting of the seat back 2, the hard band 15 in which the resin plate 15A is incorporated can be appropriately prevented by the through hole 12B1 from being strongly pressed against the upper surface 3A of the seat cushion 3.

(Summary)

In summary, the armrest 10 according to the present illustrative embodiment has the following configuration. In the following description, reference numerals in parentheses are reference numerals corresponding to the respective configurations shown in the above illustrative embodiment.

That is, the armrest (10) is the armrest (10) configured to serve as an elbow rest of the seat device (1) when the armrest (10) is tilted forward and serve as a backrest of the seat device (1) when the armrest (10) is raised rearward. The armrest (10) includes the armrest pad (12) configured to elastically support a load applied to a backrest surface that forms a front surface when the armrest (10) serves as the backrest, and an armrest cover (13) configured to cover the armrest pad (12).

The armrest (10) also includes the protrusion (15) that protrudes from the backrest surface of the armrest cover (13) and abuts against an upper surface of the seat cushion (3) of the seat device (1) when the armrest (10) is tilted forward. The armrest (10) also includes the cutout portion (12B1) formed in a region that overlaps the protrusion (15) of the armrest cover (13) in a thickness direction.

According to the above configuration, when the armrest (10) is tilted forward and the protrusion (15) is abutted against the upper surface of the seat cushion (3), a periphery of the cutout portion (12B1) of the armrest pad (12) is easily deformed due to the cutout portion (12B1) formed in the armrest pad (12). Therefore, even when the protrusion (15) is abutted against the upper surface of the seat cushion (3), an indentation is unlikely to be formed on the upper surface of the seat cushion (3).

In addition, the armrest (10) is fitted into the recess (2A) of the forward-tiltable seat back (2) of the seat device (1) from a front side so as to serve as the backrest, and the armrest (10) is tilted forward together with the seat back (2) when the seat back (2) is tilted forward so as to abut the protrusion (15) against the upper surface of the seat cushion (3). According to the above configuration, even in a configuration in which the protrusion (15) is relatively strongly abutted against the upper surface of the seat cushion (3) upon receiving weight of the armrest (10) and the seat back (2), an indentation is unlikely to be formed on the upper surface of the seat cushion (3).

In addition, the protrusion (15) is the strip-shaped band (15) that serves as a gripper when the armrest (10) is tilted forward, and the resin plate (15A) that serves as a core material is inserted into the band (15). The cutout portion (12B1) is formed in a region that overlaps the resin plate (15A) in the thickness direction. According to the above configuration, even when the protrusion (15) has a hard configuration in which the resin plate (15A) is incorporated, abutment against the upper surface of the seat cushion (3) is alleviated by the cutout portion (12B1). Therefore, an indentation is unlikely to be formed on the upper surface of the seat cushion (3).

In addition, the band (15) extends in a seat width direction, two ends of the band (15) are fixed to the armrest cover (13), and the band (15) overlaps the cutout portion (12B1) in the thickness direction over an entire region in an in-plane direction of the backrest surface. According to the above configuration, since the band (15) is configured to cover the entire region where the cutout portion (12B1) is formed, highlight can be prevented from being formed on the backrest surface of the armrest (10) due to recess of the cutout portion (12B1). In addition, since the band (15) is less likely to be embedded in a region that is easily recessed due to the cutout portion (12B1), deterioration of ride comfort can be prevented.

In addition, the armrest pad (12) includes the pad body (12A) and the laminated pad (12B) that is provided in a laminated manner on the side of the backrest surface relative to the pad body (12A) and is softer than the pad body (12A). The cutout portion (12B1) is formed to penetrate the laminated pad (12B) in the thickness direction. According to the above configuration, the cutout portion (12B1) can be appropriately formed by a simple configuration in which the through hole (12B1) is punched out in the laminated pad (12B) that is laminated in order to soften surface hardness of the armrest pad (12) on the backrest surface side.

OTHER ILLUSTRATIVE EMBODIMENTS

Although the illustrative embodiment of the present disclosure has been described above using one illustrative embodiment, the present disclosure can be implemented in various forms described below in addition to the above illustrative embodiment.

1. The armrest of the present disclosure may be applied to a seat device applied to a car other than an automobile, such as a railway car, or a seat device applied to a vehicle other than a car, such as an aircraft or a ship, in addition to the seat device of the automobile. The armrest may also be applied to a seat device that is not used on a vehicle, such as a bleacher or a massage seat installed in various facilities such as a sports facility, a theater, a concert hall, or an event hall, in addition to the vehicle.
2. The armrest pad may be formed of only one layer of urethane foam. In addition, in a case where the armrest pad has the two-layer structure including the pad body and the laminated pad softer than the pad body, the pad body and the laminated pad may both be made of molded urethane or urethane chips.
3. The armrest may be configured in such a manner that the protrusion is abutted against the upper surface of the seat cushion when the seat back is tilted forward, or in such a manner that the protrusion is abutted against the upper surface of the seat cushion when the armrest alone is tilted forward so as to use the armrest as an elbow rest without tilting the seat back. The armrest may be fitted into the recess of the seat back from the front to constitute a part of the seat back, or the armrest itself may constitute the entire center seat portion of the seat back.
4. The armrest cover may be made of a leather material instead of the fabric. The band may also be made of a leather material instead of the fabric. The band may not include the core material such as the resin plate inside the band.
5. The protrusion may be provided to protrude from the backrest surface of the armrest cover and function as a gripper when the armrest is to be pulled out, such as a strap, a hook, or a knob in addition to the band. The protrusion may also be provided to protrude from the backrest surface of the armrest cover as an attachment portion configured to improve design of the armrest or to attach certain members to the armrest, in addition to serving as the gripper when the armrest is to be pulled out.
6. The cutout portion formed in the armrest pad may be formed of a recess obtained by partially removing the armrest pad from the backrest surface side, a cavity obtained by partially removing inside of the armrest pad, or a through hole obtained by removing an entire region in the thickness direction. The cutout portion may also be formed in a shape slightly larger than the protrusion beyond the region that overlaps the protrusion, such as the band, in the thickness direction. The cutout portion may also be configured to overlap the protrusion, such as the band, in the thickness direction over a part or the entire region in the in-plane direction.

What is claimed is:

1. An armrest configured to serve as an elbow rest of a seat device in a case where the armrest is tilted forward and serve as a backrest of the seat device in a case where the armrest is raised rearward, the armrest comprising:
    an armrest pad configured to elastically support a load applied to a backrest surface forming a part of a front surface of the seat device in a case where the armrest serves as the backrest;
    an armrest cover configured to cover the armrest pad;
    a protrusion that protrudes from the backrest surface of the armrest cover and abuts against an upper surface of a seat cushion of the seat device in a case where the armrest is tilted forward; and
    a cutout portion provided in the backrest surface of the armrest pad in a region that overlaps the protrusion of the armrest cover in a thickness direction of the armrest.

2. The armrest according to claim 1,
    wherein the armrest is fitted into a recess of a forward-tiltable seat back of the seat device from a front side to serve as the backrest, and
    wherein the armrest is tilted forward together with the seat back in a case where the seat back is tilted forward to abut the protrusion against the upper surface of the seat cushion.

3. The armrest according to claim 1, further comprising a cup holder,
    wherein the cutout portion is disposed at a position displaced toward a base end side of the armrest relative to the cup holder such that overlapping in the thickness direction of the armrest with the cup holder is avoided.

4. The armrest according to claim 1, wherein
    the cutout portion having a size smaller than a size of the protrusion in a plane perpendicular to the thickness direction of the armrest.

5. The armrest according to claim 1, wherein
    the cutout portion has a rectangular hole shape,
    a hole dimension of the cutout portion in a seat height direction and a seat width direction is smaller than a dimension of the protrusion in the seat height direction and the seat width direction, and
    the cutout portion is arranged to overlap an intermediate portion excluding a peripheral edge of the protrusion in the thickness direction.

6. An armrest configured to serve as an elbow rest of a seat device in a case where the armrest is tilted forward and serve as a backrest of the seat device in a case where the armrest is raised rearward, the armrest comprising:
    an armrest pad configured to elastically support a load applied to a backrest surface forming a part of a front surface of the seat device in a case where the armrest serves as the backrest;
    an armrest cover configured to cover the armrest pad;
    a protrusion that protrudes from the backrest surface of the armrest cover and abuts against an upper surface of a seat cushion of the seat device in a case where the armrest is tilted forward; and
    a cutout portion formed in a region that overlaps the protrusion of the armrest cover in a thickness direction of the armrest,
    wherein the protrusion is a strip-shaped band that serves as a gripper in a case where the armrest is tilted forward,
    wherein a resin plate that serves as a core material is inserted into the band, and
    wherein the cutout portion is formed in a region that overlaps the resin plate in the thickness direction of the armrest.

7. The armrest according to claim 6,
    wherein the band extends in a seat width direction,
    wherein two ends of the band are fixed to the armrest cover, and
    wherein the band overlaps the cutout portion in the thickness direction of the armrest over an entire region in an in-plane direction of the backrest surface.

8. An armrest configured to serve as an elbow rest of a seat device in a case where the armrest is tilted forward and serve as a backrest of the seat device in a case where the armrest is raised rearward, the armrest comprising:
    an armrest pad configured to elastically support a load applied to a backrest surface forming a part of a front surface of the seat device in a case where the armrest serves as the backrest;
    an armrest cover configured to cover the armrest pad;
    a protrusion that protrudes from the backrest surface of the armrest cover and abuts against an upper surface of a seat cushion of the seat device in a case where the armrest is tilted forward; and
    a cutout portion formed in a region that overlaps the protrusion of the armrest cover in a thickness direction of the armrest,
    wherein the armrest pad includes:
        a pad body; and
        a laminated pad provided in a laminated manner on a side of the backrest surface relative to the pad body and softer than the pad body, and
    wherein the cutout portion is formed to penetrate the laminated pad in the thickness direction of the armrest.

* * * * *